United States Patent
Ciais et al.

[19]

[11] Patent Number: 6,116,203
[45] Date of Patent: Sep. 12, 2000

[54] METHOD FOR MAKING AN INTERNAL COMBUSTION ENGINE PISTON IN THERMOSTRUCTURAL COMPOSITE MATERIAL

[75] Inventors: Jean-Pierre Ciais, Le Pian Medoc; Jacques Thebault, Bordeaux, both of France

[73] Assignee: Societe Nationale d'Etude et de Construction de Moteurs d'Aviation - S.N.E.C.M.A., Paris, France

[21] Appl. No.: 09/380,325

[22] PCT Filed: Dec. 28, 1998

[86] PCT No.: PCT/FR98/02895

§ 371 Date: Aug. 27, 1999

§ 102(e) Date: Aug. 27, 1999

[87] PCT Pub. No.: WO99/33767

PCT Pub. Date: Jul. 8, 1999

[30] Foreign Application Priority Data

Dec. 29, 1997 [FR] France ................................... 97 16615

[51] Int. Cl.$^7$ .......................... C04B 35/83; C04B 35/80; F16J 1/01
[52] U.S. Cl. .................................. 123/193.6; 29/888.046
[58] Field of Search .......................... 123/193.6; 92/248; 29/888.04, 888.042, 888.043, 888.046; 264/29.5; 28/110

[56] References Cited

U.S. PATENT DOCUMENTS

| 4,790,052 | 12/1988 | Olry ....................................... 28/110 |
| 4,852,630 | 8/1989 | Hamajima et al. ..................... 164/761 |
| 4,909,133 | 3/1990 | Taylor et al. .............................. 92/212 |
| 5,154,109 | 10/1992 | Fluga et al. ............................... 92/248 |
| 5,740,788 | 4/1998 | Atmur et al. ......................... 123/193.6 |
| 5,900,193 | 5/1999 | Rivers et al. .......................... 264/29.5 |
| 5,948,330 | 9/1999 | Rivers et al. .......................... 264/29.5 |
| 6,029,346 | 2/2000 | Chellappa ............................ 29/888.04 |

FOREIGN PATENT DOCUMENTS

| 147297 | 7/1985 | European Pat. Off. . |
| 2912786 | 5/1980 | Germany . |
| 3001921 | 7/1981 | Germany . |

*Primary Examiner*—Marguerite McMahon
*Attorney, Agent, or Firm*—Weingarten, Schurgin, Gagnebin & Hayes LLP

[57] ABSTRACT

A fiber structure is made by superposing plies of fiber fabric and bonding the plies together by needling, so that the fibers of the superposed plies extend essentially in a first direction (X) and in a second direction (Y) orthogonal thereto, the plies being bonded together by fibers that are moved by the needling in a third direction (Z) extending transversely relative to the plies, and a piston preform is cut out from the needled fiber structure so that one of the first and second directions (X, Y) is parallel to the generator lines of the surface of the preform that corresponds to the cylindrical side surface of the piston. The preform is densified at least in part by the substance that constitutes the matrix of the composite material, and the piston is machined from the densified preform.

13 Claims, 2 Drawing Sheets

METHOD FOR MAKING AN INTERNAL COMBUSTION ENGINE PISTON IN THERMOSTRUCTURAL COMPOSITE MATERIAL

FIELD OF THE INVENTION

The present invention relates to manufacturing a piston for an internal combustion engine out of thermostructural composite material, i.e. a material that comprises fiber reinforcement of refractory fibers densified by means of a matrix of refractory material.

BACKGROUND OF THE INVENTION

Thermostructural composite materials are characterized by their mechanical properties which make them suitable for constituting structural elements, and by their ability to retain these properties up to high temperatures. These materials are in particular carbon/carbon (C/C) composite materials comprising reinforcement made of carbon fibers embedded in a carbon matrix, and ceramic matrix composite (CMC) materials comprising reinforcement of refractory fibers, such as carbon or ceramic fibers, embedded in a ceramic matrix.

Because of their properties, thermostructural composite materials can replace metal materials for making parts that are subjected to mechanical forces and that are liable to be exposed to high temperatures.

Thus, proposals have already been made to make pistons for internal combustion engines out of C/C composite material. In addition to withstanding temperature, C/C composite materials have the advantage of density that is much smaller than that of metals, thereby making it possible to reduce moving masses and to increase the maximum speed of rotation of the engine. In addition, the low thermal expansion of the material and its good tribological properties greatly reduce the risk of the piston seizing or binding, thereby making it possible to increase the reliability of the engine and reduce its requirements for lubrication.

Reference can be made to document U.S. Pat. No. 4,909,133 which describes the manufacture of a piston by making an article of fiber reinforcement, or "preform", as a single piece in the form of a knitted "sock" of carbon fibers, impregnating the preform with a resin for molding and densification by means of a carbon matrix by using a liquid process (impregnation with the resin followed by carbonization) and finished off by a gas process (chemical vapor infiltration).

Document DE-A-29 12 786 also describes making a C/C composite material piston by winding a carbon thread and then impregnating with a carbon-containing resin. The outside surface of the piston on its side that is exposed to combustion gases is coated in a protective layer of silicon carbide.

In a C/C composite material piston, it is necessary to ensure that the reinforcement fibers are oriented in directions that are suitable for the forces to which the piston is subjected in operation. The techniques described in the two above-mentioned documents can satisfy that condition, but in a manner that is expensive. They require preforms to be made individually in relatively complex manner: knitting a "sock" or winding a filament over a predetermined path.

BRIEF SUMMARY OF THE INVENTION

An object of the invention is to provide a method of manufacturing a piston of thermostructural composite material in which the preparation of the preform is simplified compared with the above state of the art, so that manufacturing costs can be substantially reduced.

In a first aspect of the invention, this object is achieved by a method which comprises the steps consisting in:

making a fiber structure by superposing plies of fiber fabric and bonding the plies together by needling, so that the fibers of the superposed plies extend essentially in a first direction (X) and in a second direction (Y) orthogonal thereto, the plies being bonded together by fibers that are displaced by the needling in a third direction (Z) that is transverse relative to the plies;

cutting out a piston preform from the needled fiber structure so that one of the first and second directions (X, Y) is parallel to the generator lines of the surface of the preform that corresponds to the cylindrical side surface of the piston;

densifying the preform at least partially with the material constituting the matrix; and machining the piston from the densified preform.

Preferably, the method further comprises the steps consisting in:

densifying the cutout preform partially;

machining a piston blank from the partially densified preform;

continuing densification of the piston blank; and performing final machining of the piston.

The invention is remarkable in that the piston preforms or blanks are obtained from a fiber structure that is made simply by needling superposed plies in which the fibers are essentially oriented in two orthogonal directions (X, Y). The plies can be layers of woven cloth or unidirectional sheets, in which case the sheets are superposed in alternating orthogonal directions. The overall volume occupancy of the fibers in the fiber structure lies in the range 25% to 40% and the volume occupancy of the fibers in the third direction (Z) is not less than 3%.

Preferably, the machining of the piston includes forming a bore for receiving a wrist pin, the bore extending substantially parallel to the third direction (Z).

According to a feature of the method, when the material constituting the matrix is carbon, heat treatment for graphitizing the carbon of the matrix is performed so as to improve its thermal conductivity.

In a second aspect of the invention, the invention also provides a thermostructural composite material piston as obtained by the above-defined methods.

Other features and advantages of the invention will appear on reading the following description given by way of non-limiting indication.

DETAILED DESCRIPTION OF PREFERRED EMBODIMENTS

Below, it is assumed that pistons for an internal combustion engine are made of C/C composite material. Nevertheless, the person skilled in the art will immediately understand that the invention is also applicable to manufacturing pistons out of thermostructural composite materials other than C/C materials, and in particular out of CMCs.

Figure 2:
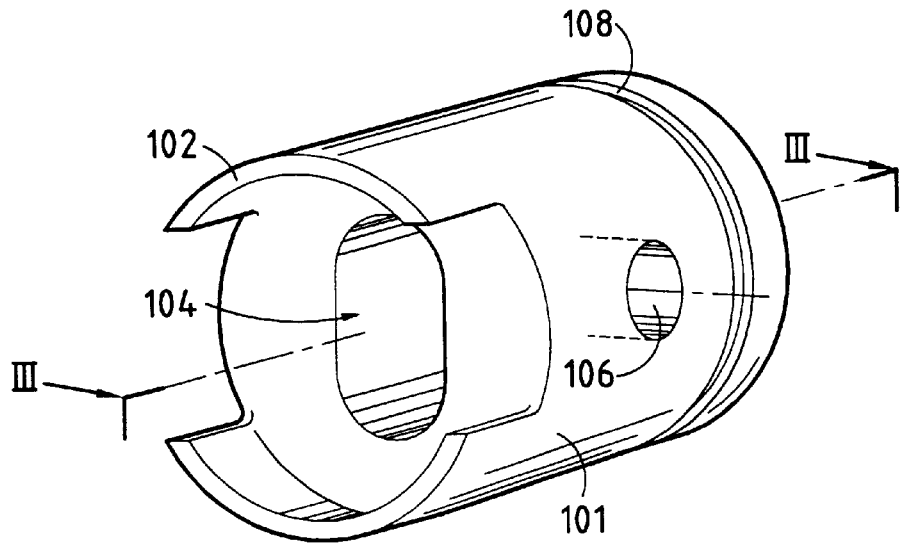
FIG. 2 is a diagrammatic perspective view of a piston obtained by the invention.
Figure 3:
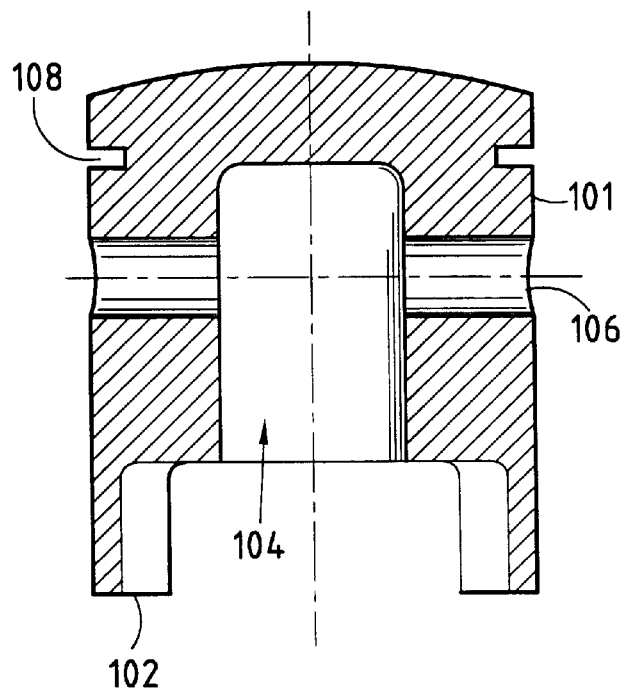
FIG. 3 is a section view of the FIG. 2 piston.

A first step 10 of a method of the invention consists in making a fiber structure by superposing and needling together plies of fiber fabric, as shown in FIG. 2.

The plies 12 are formed and disposed in such a manner that the fibers in the superposed plies are oriented essentially in two orthogonal directions X and Y. In the example shown, the plies are layers of woven cloth. The cloth is preferably balanced (same densities in the warp and weft directions) using plane weave or satin weave. The layers of cloth are superposed with their warp and weft directions the same.

In a variant, the plies can be made up of sheets of unidirectional threads or tow. The sheets are then superposed alternately parallel to the X direction and to the Y direction.

The plies 12 are needled by means of a needle board 14 which extends over the entire length of one of the dimensions of the plies and which is driven with reciprocating motion in a direction Z that is transverse relative to the plies 12, and preferably perpendicular thereto. Each new ply is needled over its entire area by relative displacement between the ply support 16 and the needle board. Needling is preferably performed at constant density, as described in document U.S. Pat. No. 4,790,052.

The superposition and needling together of the plies is stopped once the thickness of the fiber structure has reached a value that is slightly greater than the diameter of the pistons that are to be made.

The needling can be performed on plies of carbon fibers, particularly when the threads constituting the plies are formed of discontinuous fibers which can be taken by the needles without significantly damaging the threads.

Needling can also be performed on plies of fibers made of a carbon precursor, so as to avoid the destructive effect that the needles could have on carbon threads. Carbon precursors fibers are constituted in particular by cellulose fibers, phenol fibers, pitch fibers, and preoxidized polyacrylonitrile (PAN) fibers. The precursor is transformed into carbon by heat treatment performed on the needled structure.

In order to give the desired mechanical properties to the final material, it is preferable for the volume occupied by the fibers in the resulting carbon fiber structure to lie in the range 25% to 40%. The term "fiber volume occupancy" is used herein to designate the percentage of the apparent volume of the structure that is actually occupied by the fibers.

In addition, in order to give sufficient cohesion between the plies to oppose subsequent decohesion or delamination, it is preferable for the volume occupancy of fibers that have been displaced in the Z direction during needling to bond the plies together should be not less than 3%.

A second step (20) of the method consists in cutting the needled fiber structure 18 into strips 22 of width that is slightly greater than the height of the pistons to be made, and then in cutting cylindrically-shaped piston preforms 24 from the strips 22. The preforms 24 are cut out in such a manner that one of the directions X and Y is parallel to the piston longitudinal axis along the outside surface 34a of the preform which corresponds to the peripheral side surface of the piston that is to be made, while the other direction is parallel to the end surface 36 of the preform corresponding to the top surface of the piston that is to be exposed to combustion gases.

The strips 22 and the preforms 24 can be cut out by means of tools such as saws or punches, or indeed and preferably, by means of a jet of water under very high pressure.

A third step (30) consists in densifying the piston preform 24 with carbon constituting the matrix of the C/C composite material.

Densification can be performed by a liquid process and/or by a gas process. Liquid densification consists in impregnating the preform with a carbon precursor, e.g. a resin having a high coke content, and then in performing heat treatment to carbonize the resin so as to obtain a matrix of pyrolytic carbon. A plurality of cycles of impregnation followed by heat treatment can be performed in succession. Gas densification consists in performing chemical vapor infiltration.

Chemical vapor infiltration processes for forming pyrolytic carbon matrixes are well known. The same applies to methods enabling matrices to be made of refractive materials other than carbon, e.g. ceramics.

After densification step 30, high temperature heat treatment can be performed to transform the pyrolytic carbon of the matrix into graphite (step 40). This graphitization is performed at a temperature of about 2000° C. Graphitization serves to increase the thermal conductivity of carbon, thereby enabling heat to be removed better from the surface of the piston that comes into contact with the combustion gases.

Thereafter, the piston is machined to its final dimensions (step 50). FIG. 2 shows a piston 100 obtained in this way, e.g. for a two-stroke engine. The machining comprises forming a skirt 102 at the back of the piston, a blind longitudinal recess 104 opening out to the back of the piston inside the skirt to receive a connecting rod, a transverse bore 106 passing through the piston, perpendicularly to the cylindrical side surface 101 thereof and opening out into the recess 104 so as to receive a wrist pin (not shown) for securing the connecting rod, and at least one peripheral housing or groove 108 formed in the side wall 101 to receive a piston ring for sealing (not shown). The piston ring will commonly be in the form of a split ring which is opened to be put into place in the groove 108.

The transverse bore 106 is preferably made in a direction that extends transversely relative to the initial plies, e.g. substantially parallel to the Z direction of the fibers that are displaced by the needling.

Figure 1:
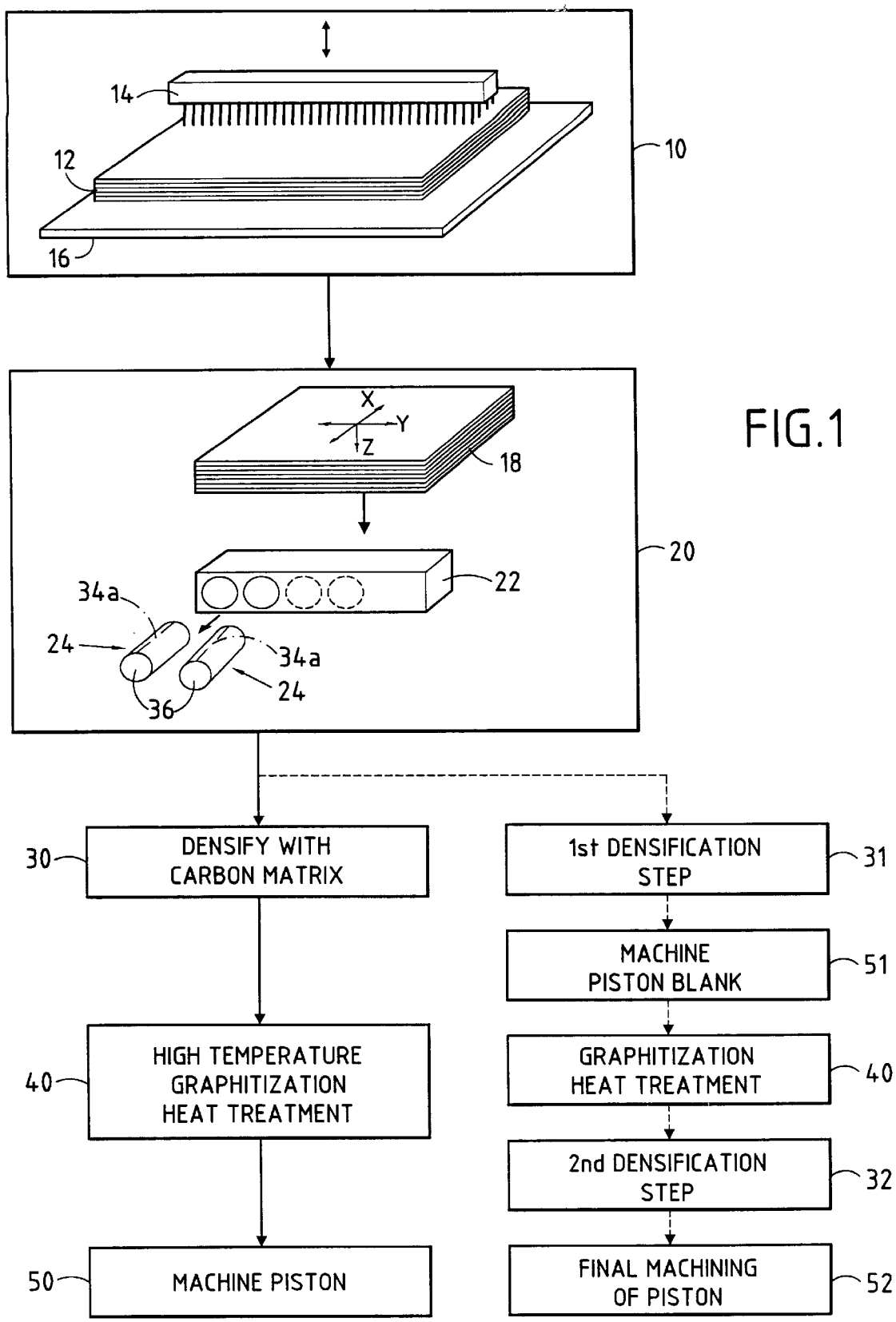
FIG. 1 shows the successive steps in implementing a method of the invention.

In a preferred implementation of the method described above, and also shown in FIG. 1, the piston preform can be densified in two steps 31 and 32 separated by an intermediate machining step 51 and followed by a final machining step 52. The high temperature heat treatment 40 can then be performed after the intermediate machining 51 and before final densification (52). The other steps of the method are similar to those described above.

The intermediate machining seeks to bring the piston to a shape that is close to its final shape. It has the advantage whereby the piston which has already been subjected to a first step of densification, is then "peeled" so that matrix material can infiltrate to the core of the preform during final densification, thereby minimizing the densification gradient within the composite material. It is well known that during a chemical vapor infiltration process performed under isothermal conditions, the matrix material tends to deposit preferentially in the portions of the preform that are close to its exposed surfaces, thereby slowing down densification in the core thereof, and can lead to premature closure of surface pores. The intermediate surface machining ("peeling") serves to open up the surface pores and to facilitate continuing densification.

What is claimed is:

1. A method of making a piston for an internal combustion engine out of thermostructural composite material formed of fiber reinforcement densified by a matrix, the method being characterized in that it comprises the steps consisting in:

making a fiber structure by superposing plies of fiber fabric and bonding the plies together by needling, so that the fibers of the superposed plies extend essentially in a first direction (X) and in a second direction (Y) orthogonal thereto, the plies being bonded together by fibers that are displaced by the needling in a third direction (Z) that is transverse relative to the plies;

cutting out a piston preform from the needled fiber structure so that one of the first and second directions (X, Y) is parallel to the piston longitudinal of the preform that corresponds to the cylindrical side surface of the piston;

densifying the preform at least partially with the material constituting the matrix; and machining the piston from the densified preform.

2. A method according to claim 1, characterized in that it further comprises the steps consisting in:

densifying the cutout preform partially;

machining a piston blank from the partially densified preform;

continuing densification of the piston blank; and performing final machining of the piston.

3. A method according to claim 1, characterized in that the piston preform is cut out by means of a jet of water under pressure.

4. A method according to claim 1, characterized in that the overall volume occupancy of fibers in the fiber structure lies in the range 25% to 40%.

5. A method according to claim 1, characterized in that the fiber volume occupancy in the third direction (Z) is not less than 3%.

6. A method according to claim 1, characterized in that the plies constituting the fiber structure are selected from layers of woven cloth and from unidirectional sheets.

7. A method according to claim 1, characterized in that the machining of the piston includes forming a bore for receiving a wrist pin, the bore extending transversely to the plies of the initial fiber structure.

8. A method according to claim 1, characterized in that the machining of the piston includes forming a bore for receiving a wrist pin, the bore extending substantially parallel to the third direction (Z).

9. A method according to claim 1, in which densification is performed by means of a carbon matrix, the method being characterized in that it includes a step of applying graphitization heat treatment to the carbon.

10. A method according to claim 2, characterized in that:

the piston preform is cut out by means of a jet of water under pressure;

the overall volume occupancy of fibers in the fiber structure lies in the range 25% to 40%; and the fiber volume occupancy in the third direction (Z) is not less that 3%;

that the plies constituting the fiber structure are selected from layers of woven cloth and from unidirectional sheets;

the machining of the piston includes forming a bore for receiving a wrist pin, the bore extending transversely to the plies of the initial fiber structure and substantially parallel to the third direction (Z).

11. A method according to claim 10, in which densification is performed by means of a carbon matrix, the method being characterized in that it includes a step of applying graphitization heat treatment to the carbon.

12. A piston for an internal combustion engine, the piston having a cylindrical side surface and being made of a thermostructural composite material comprising fiber reinforcement densified by a matrix, the piston being characterized in that the fiber reinforcement comprises superposed plies in which the fibers are oriented essentially in a first direction (X) and in a second direction (Y) orthogonal thereto, the plies are bonded together by fibers placed in a direction (Z) extending transversely relative to the plies, one of the first and second directions (X, Y) being parallel to the piston longitudinal axis along the cylindrical side surface of the piston.

13. A piston according to claim 12, including a pin-receiving bore (106) extending transversely, the piston being characterized in that the bore extends substantially parallel to the third direction (Z).

\* \* \* \* \*

UNITED STATES PATENT AND TRADEMARK OFFICE
CERTIFICATE OF CORRECTION

PATENT NO.   : 6,116,203
DATED        : September 12, 2000
INVENTOR(S)  : Jean-Pierre Ciais et al.

It is certified that error appears in the above-identified patent and that said Letters Patent is hereby corrected as shown below:

Title page, Item [54], Column 1, lines 1-4,
Title, "METHOD FOR MAKING AN INTERNAL COMBUSTION ENGINE PISTON IN THERMOSTRUCTURAL COMPOSITE MATERIAL" should read -- METHOD OF MANUFACTURING A PISTION FOR AN INTERNAL COMBUSTION ENGINE OUT OF THERMOSTRUCTURAL COMPOSITE MATERIAL --;

Column 5,
Line 15, "longitudinal" should read -- longitudinal axis --.

Signed and Sealed this

Ninth Day of July, 2002

Attest:

JAMES E. ROGAN
Attesting Officer        Director of the United States Patent and Trademark Office